United States Patent
Jorstad et al.

(10) Patent No.: US 12,437,218 B2
(45) Date of Patent: Oct. 7, 2025

(54) METHODS OF EXPLAINING AN INDIVIDUAL PREDICTIONS MADE BY PREDICTIVE PROCESSES AND/OR PREDICTIVE MODELS

(71) Applicant: Synchrony Bank, Stamford, CT (US)

(72) Inventors: Gregory Dean Jorstad, Draper, UT (US); Thomas Patrick Prendergast, Draper, UT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 18/358,098

(22) Filed: Jul. 25, 2023

(65) Prior Publication Data

US 2023/0419134 A1    Dec. 28, 2023

Related U.S. Application Data

(63) Continuation of application No. 17/930,076, filed on Sep. 7, 2022, now Pat. No. 11,810,009, which is a continuation of application No. 16/293,407, filed on Mar. 5, 2019, now Pat. No. 11,475,322.

(51) Int. Cl.
*G06N 5/04* (2023.01)
*G06N 20/00* (2019.01)
*G06F 3/14* (2006.01)

(52) U.S. Cl.
CPC .............. *G06N 5/04* (2013.01); *G06N 20/00* (2019.01); *G06F 3/14* (2013.01)

(58) Field of Classification Search
CPC ............. G06N 5/04; G06N 20/00; G06F 3/14
USPC ......................................................... 706/11
See application file for complete search history.

(56) References Cited

U.S. PATENT DOCUMENTS

| | | | | |
|---|---|---|---|---|
| 9,171,259 B1 * | 10/2015 | Laxmanan | ............. | G06N 5/022 |
| 9,280,740 B1 * | 3/2016 | Laxmanan | ............. | G06N 20/00 |
| 11,080,336 B2 * | 8/2021 | Van Dusen | ............. | G06N 5/02 |
| 11,113,274 B1 * | 9/2021 | Thiel | ...................... | G06N 20/00 |
| 11,328,220 B2 * | 5/2022 | Parker | ................... | G06N 5/046 |

(Continued)

OTHER PUBLICATIONS

International Search Report & Written Opinion mailed Jun. 17, 2020 in International Application PCT/US2020/021081.

(Continued)

*Primary Examiner* — William D Titcomb
(74) *Attorney, Agent, or Firm* — Polsinelli LLP

(57) ABSTRACT

A computer-implemented method that includes obtaining a plurality of values each corresponding to one of a plurality of variables. The plurality of variables include variables of interest. The method includes obtaining a prediction for the values from a model, determining metric(s) for each of the variables of interest, and determining one or more of the variables of interest to be one or more influential variables based on the metric(s) determined for each of the variables of interest. The variables include one or more non-influential variables that is/are different from the influential variable(s). The influential variable(s) has/have a greater influence on the prediction than the non-influential variable(s). The method also includes displaying in a graphical user interface or printing in a report an explanation identifying the influential variable(s) and/or a justification of the determination that the influential variable(s) has/have a greater influence on the prediction than the non-influential variable(s).

21 Claims, 9 Drawing Sheets

(56) References Cited

U.S. PATENT DOCUMENTS

| | | | |
|---|---|---|---|
| 2014/0365403 A1 | 12/2014 | Demuth et al. | |
| 2015/0178626 A1 | 6/2015 | Pielot et al. | |
| 2015/0339572 A1 | 11/2015 | Achin et al. | |
| 2015/0379428 A1* | 12/2015 | Dirac | G06N 20/00 |
| | | | 706/12 |
| 2015/0379430 A1* | 12/2015 | Dirac | G06N 20/00 |
| | | | 706/12 |
| 2017/0124492 A1* | 5/2017 | Crabtree | G06N 20/00 |
| 2017/0154268 A1 | 6/2017 | Goldin | |
| 2017/0220751 A1* | 8/2017 | Davis | A61M 5/14244 |
| 2017/0236066 A1* | 8/2017 | Ruiz | G06N 5/04 |
| | | | 706/52 |
| 2018/0046926 A1 | 2/2018 | Achin et al. | |
| 2018/0060738 A1* | 3/2018 | Achin | G06N 20/00 |
| 2018/0060744 A1* | 3/2018 | Achin | G06N 20/00 |
| 2018/0129651 A1 | 5/2018 | Latvala et al. | |
| 2018/0322406 A1* | 11/2018 | Merrill | G06N 20/20 |
| 2019/0087744 A1 | 3/2019 | Schiemenz | |
| 2019/0220705 A1 | 7/2019 | Min et al. | |
| 2019/0258904 A1 | 8/2019 | Ma et al. | |
| 2020/0019393 A1* | 1/2020 | Vichare | G06N 20/00 |

OTHER PUBLICATIONS

International Preliminary Report on Patentability mailed Sep. 16, 2021 in International Application PCT/US2020/021081.
Notice of Allowance mailed Jun. 9, 2022 in U.S. Appl. No. 16/293,407.
Office Action mailed Apr. 6, 2022 in U.S. Appl. No. 16/293,407.
Notice of Allowance mailed May 3, 2023 in U.S. Appl. No. 17/930,076.

* cited by examiner

| INPUT VARIABLE | Actualscore (bin) | RANK 1 | RANK 2 | RANK 3 | RANK 4 | RANK 5 | RANK 6 |
|---|---|---|---|---|---|---|---|
| 125 | 0.8 | 13.21% | 4.60% | 2.67% | | 3.13% | 3.23% |
| 125 | 0.7 | 17.65% | 16.77% | 7.74% | 10.94% | 9.33% | 1.33% |
| 125 | 0.6 | 28.09% | 16.60% | 7.55% | 1.94% | 7.74% | 1.94% |
| 125 | 0.5 | 44.44% | 17.78% | 4.44% | 3.40% | 4.15% | 2.64% |
| 125 | | | | | 2.35% | 2.64% | 2.22% |
| 126 | 0.8 | 4.76% | 9.68% | 42.31% | 50.00% | 100.00% | 33.33% |
| 126 | 0.7 | 6.41% | 18.67% | 18.67% | 16.00% | 14.81% | 11.76% |
| 126 | 0.6 | 12.26% | 18.71% | 10.17% | 12.40% | 3.73% | 6.72% |
| 126 | 0.5 | 14.72% | 22.26% | 2.22% | 7.14% | 6.08% | 2.28% |
| 126 | | 17.78% | 44.44% | | | 4.26% | 2.13% |

FIG. 11

METHODS OF EXPLAINING AN INDIVIDUAL PREDICTIONS MADE BY PREDICTIVE PROCESSES AND/OR PREDICTIVE MODELS

CROSS REFERENCE TO RELATED APPLICATIONS

The present application is a continuation of U.S. patent application Ser. No. 17/930,076 filed Sep. 7, 2022, which is a continuation of U.S. patent application Ser. No. 16/293,407 filed Mar. 5, 2019, which are incorporated herein by reference in their entireties.

BACKGROUND OF THE INVENTION

Field of the Invention

The present invention is directed generally to predictive processes and predictive models and, more particularly, to methods of explaining results obtained from predictive processes and/or predictive models.

Description of the Related Art

Machine learning models are being used in decision making processes in many industries. In particular, machine learning models are being applied to industries that have greater levels of accountability in decision making. In other words, decisions in such industries must be explained (e.g., to customers, regulators, and the like).

Researchers have recently developed new methodologies, such as Local Interpretable Model-agnostic Explanations ("LIME"), that can provide explanations for individual decisions made by a large family of machine learning models, such as random forests, neural networks, or support vector machines. These methods provide either a heuristic or mathematical definition of the explanations that are produced but are not designed to directly meet all of the practical needs for explanations in regulated industries. For example, these methods may be computationally expensive when applied in the context of real-time decisions, may not produce deterministic results, may produce explanations that do not directly match the requirements of regulated industries, and do not directly provide methods to justify the explanations that are produced.

Scorecard technology has been a longstanding and successful approach to develop models and explanations for use in regulated industries. However, scorecard technology tightly ties the method of generating models to the method of generating explanations. Scorecard models are also some of the simplest models and aren't always able to model the complexities of some real-life relationships, especially as alternative sources of data are introduced into decisions. In particular, scorecard models cannot model the types of data and relationships used in fraud determinations. These limitations can result in sub-optimal decision making and may restrict the ability of institutions to reduce fraud losses or provide credit to most qualified consumers.

Unfortunately, practitioners have been left in a challenging situation, with increasing pressure to optimize performance using advanced machine learning models but without a fully developed set of tools and methods needed to generate industry-acceptable explanations of the results produced by these models.

BRIEF DESCRIPTION OF THE SEVERAL VIEWS OF THE DRAWING(S)

FIG. 11 is a second computer generated visualization illustrating explanations divided into score bins that were created based on actual predictions.

Like reference numerals have been used in the figures to identify like components.

DETAILED DESCRIPTION OF THE INVENTION

Figure 1:
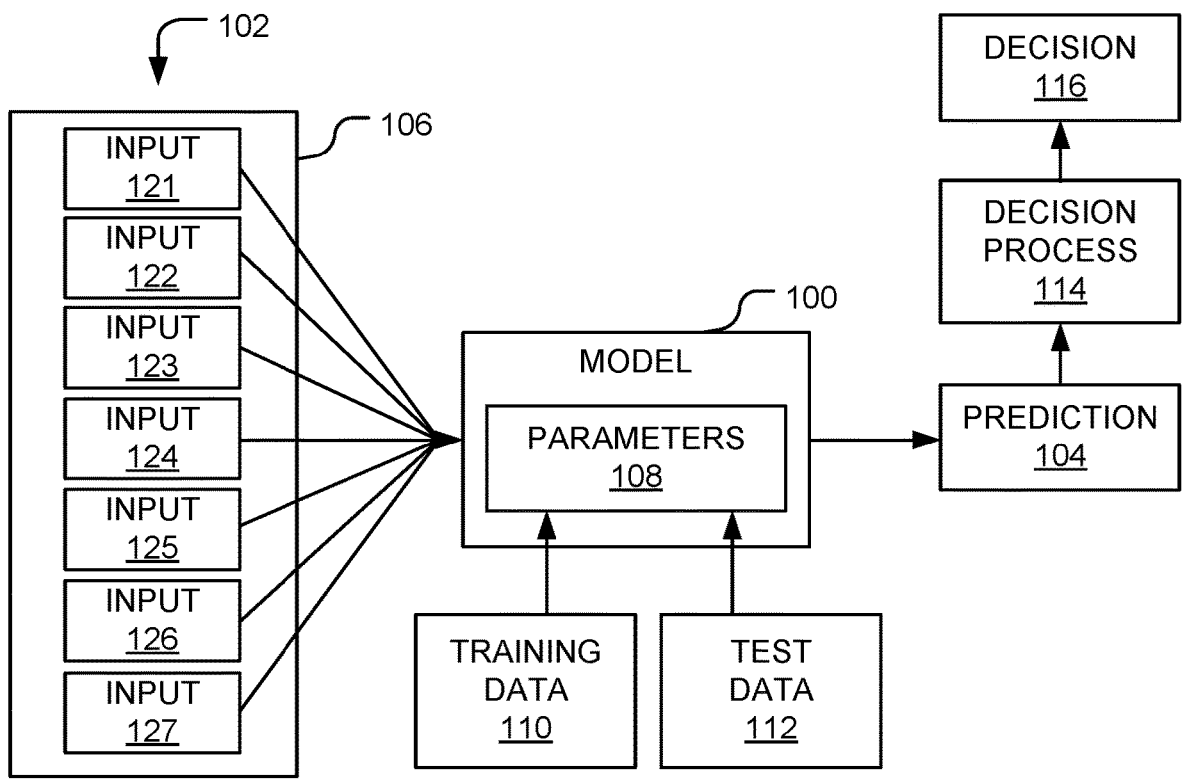
FIG. 1 is a block diagram illustrating a machine learning model.

FIG. 1 is block diagram illustrating a machine learning model 100. The model 100 may be implemented using any machine learning or predictive analytics technique known in the art. For example, the model 100 may be implemented as a predictive machine learning model, such as a decision tree, a neural network, and the like. By way of additional non-limiting examples, the model 100 may be implemented as a set of rules, a random forest, a deep learning model, a support vector machine, a classification model, a regression model, and the like. Further, the model 100 may include non-linearities.

The model 100 is configured to receive values of a plurality of input variables 102 and output a score or prediction 104. As is apparent to those of ordinary skill in the art, the model 100 includes model parameters 108 the values of which may have been determined by training the model 100 using training data 110. The model parameters 108 may have been tested using test data 112. The model 100 is trained and tested before it is deployed and used to obtain the prediction 104. When deployed, the model 100 may be configured to receive the input variables 102 and output the prediction 104 in real-time.

The input variables 102 include a number "x" of input variables. In the example illustrated, the input variables 102 have been illustrated as including seven input variables 121-127. However, the input variables 102 may include any number of input variables. Each of the input variables 102 may be implemented as a categorical or continuous variable. In the embodiment illustrated, the values of the input variables 102 are stored in an input record 106.

A decision process 114 may use the prediction 104 to output a decision 116. For example, the prediction 104 may be a numeric value that indicates a likelihood that a pass condition will occur or a likelihood that the fail condition will occur. By way of a non-limiting example, if the prediction 104 is a likelihood that a pass condition will occur, the decision process 114 may compare the prediction 104 to a threshold value and the decision may be "PASS" when the prediction 104 is greater than the threshold value and "FAIL" when the prediction 104 is less than the threshold value.

Figure 2:
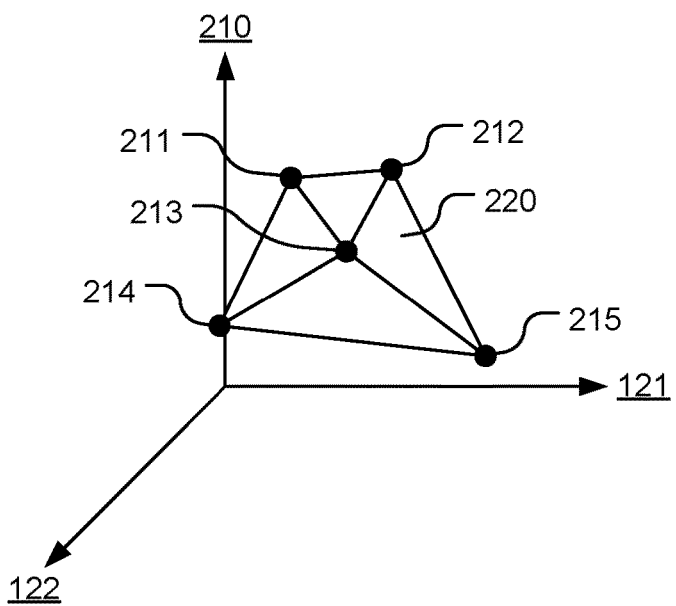
FIG. 2 is a graph of a prediction surface.

When in use, the model 100 receives a plurality of records (each like the input record 106) and produces a different prediction (like the prediction 104) for each record. The plurality of records may be provided one at a time or as a production dataset. FIG. 2 is a graph illustrating predictions 211-215 obtained by supplying five different records (not shown) including values of the input variables 121-127 to the model 100. In FIG. 2, the predictions 211-215 have been plotted as a function of the input variables 121 and 122 because the visual depiction of FIG. 2 is limited to only three dimensions. Nevertheless, the predictions 211-215 were determined as a function of all of the input variables 102 (see FIG. 1). As shown in FIG. 2, the predictions 211-215 may be viewed geometrically as defining a portion of a prediction surface 220 in an n-dimensional feature space. The number "n" is equal to the number "x" plus one. For example, when the input variables 121-127 are used, the feature space has eight dimensions. A vertical dimension 210 represents values of the predictions generated by the model 100. The prediction surface 220 includes all of the predictions generated for all possible values of the input variables 102 (see FIG. 1). By way of a non-limiting example, when the model 100 is a classification model, the vertical dimension 210 may represent a numeric probability of a particular result, or, alternatively, a binary value (1 or 0) indicating presence or absence of a particular condition. By way of another non-limiting example, when the model 100 is a regression model, the vertical dimension 210 may directly represent the predicted value.

Explanation Procedure

Referring to FIG. 1, it is sometimes useful to determine why the model 100 outputs a particular prediction. For example, if the prediction 104 indicates the fail condition is likely to occur, a user may like to know why. In this regard, one or more of the input variables 102 may have a greater influence on the prediction 104 than the other input variables 102.

Figure 3:
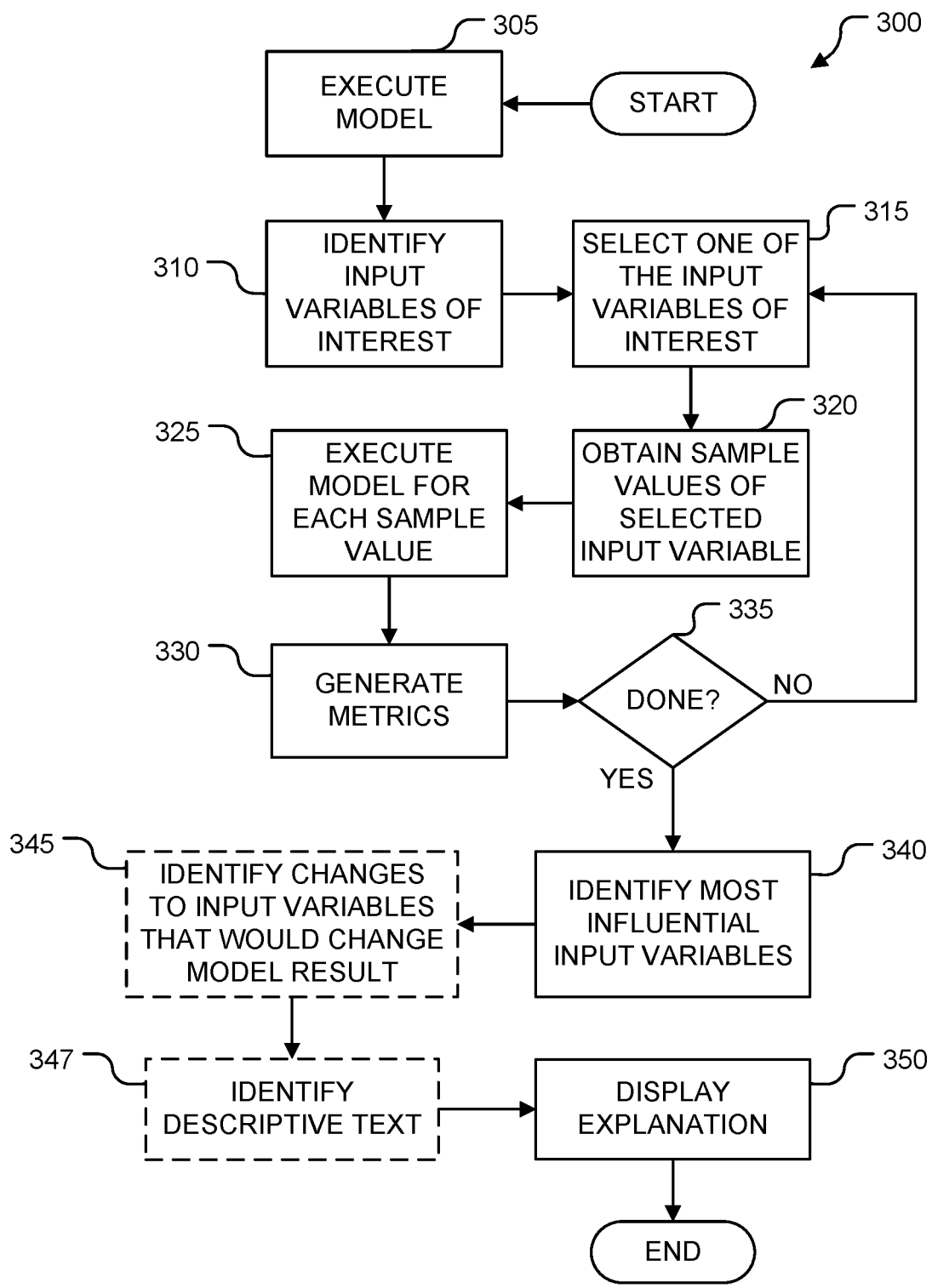
FIG. 3 is a flow diagram of an explanation procedure performed by an explanation computing device of FIG. 4.
Figures 4, 5:
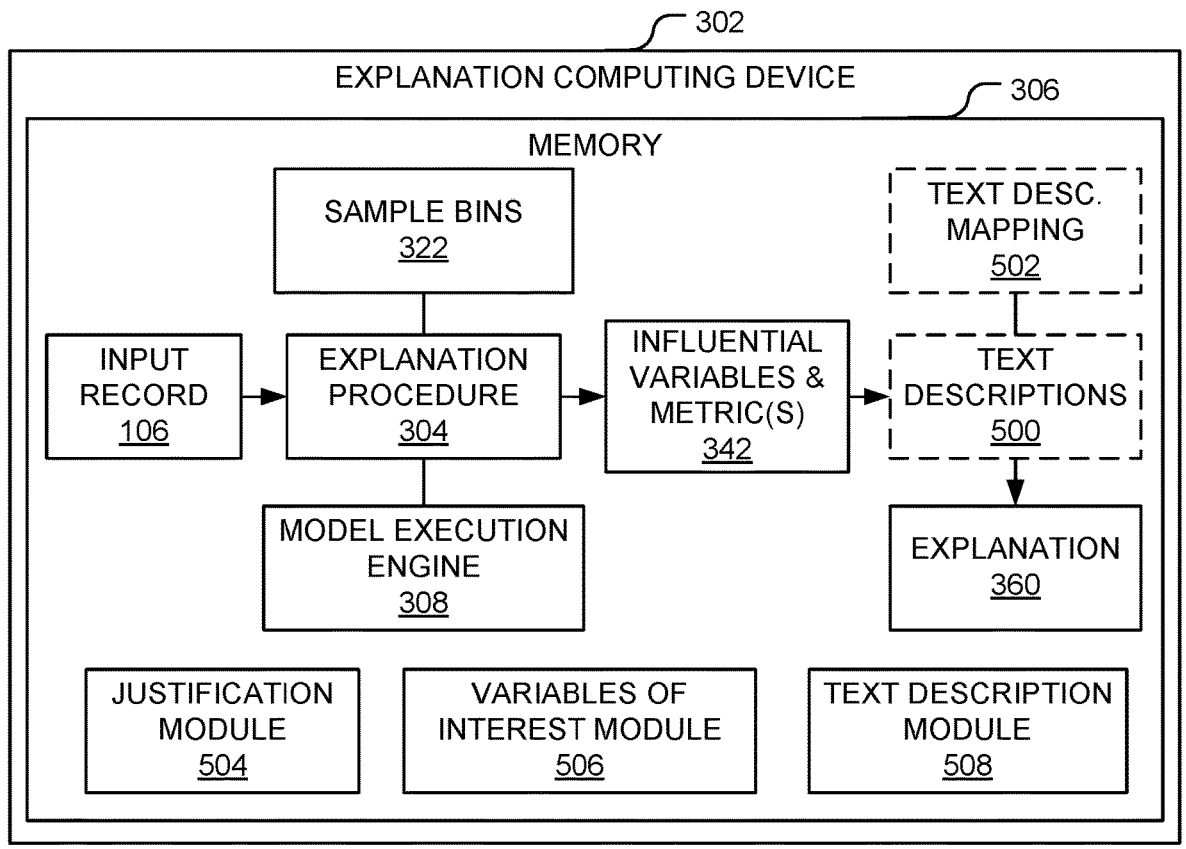
FIG. 4 is a block diagram illustrating some components of the explanation computing device.
FIG. 5 is an illustration of an explanation generated by the explanation procedure of FIG. 3.

FIG. 3 is a flow diagram of an explanation procedure 300 performed by an explanation computing device 302 (see FIG. 4). Referring to FIG. 4, the explanation procedure 300 may be stored as computer-executable instructions 304 stored in memory 306, which may be implemented as a system memory 22 illustrated in FIG. 13. The memory 306 may be distributed across the memory of multiple machines and/or include disk storage. By way of a non-limiting example, the explanation procedure 300 may be implemented using Apache Spark.

Referring to FIG. 3, the explanation procedure 300 identifies a number "i" of the most influential of the input variables 102 (see FIG. 1) on the prediction 104 (see FIG. 1). The explanation procedure 300 may be used with any machine learning model and the explanation computing device 302 (see FIG. 4) need not know any details with respect to the model 100 (see FIG. 1). In other words, the model 100 may be a black box to the explanation procedure 300.

The explanation procedure 300 may be performed off-line and/or on-line with respect to another process. When performed on-line, the explanation procedure 300 may be used to understand decisions made by the model 100 (see FIG. 1) in real-time. The explanation procedure 300 may be used to provide explanations for on-line streaming data in addition to off-line batch data. As is explained below with respect to FIG. 7, the explanation procedure 300 (see FIG. 3) may use Spark Streaming and Kafka technologies to ingest the input record 106 (see FIGS. 1 and 4) in a streaming manner and produce an explanation in a streaming manner.

Referring to FIG. 3, the explanation procedure 300 operates by re-sampling the prediction surface (e.g., the prediction surface 220 illustrated in FIG. 2) around the prediction 104 (see FIG. 1) being explained. The prediction surface is re-sampled for each input variable separately to evaluate the impact of changes to that input variable on the resulting prediction. In other words, all of the input variables 102 (see FIG. 1) are held constant except one, which is sampled at different values.

The explanation procedure 300 is performed separately for each prediction (e.g., one of the predictions 211-215 illustrated in FIG. 2) for which an explanation is desired. For ease of illustration, the prediction 104 (see FIG. 1) will be described as being explained by the explanation procedure 300 and will be referred to as being an actual prediction. As mentioned above, the actual prediction 104 was obtained by executing the model 100 on the values of the input variables 102 included in the input record 106.

In first block 305, referring to FIG. 1, the explanation computing device 302 (see FIG. 4) executes the model 100 on the original unmodified input record 106 to obtain the actual prediction 104. Referring to FIG. 4, the explanation computing device 302 may execute the model 100 (see FIG. 1) by calling a model execution engine 308 and passing it the values of the input variables 102 (see FIG. 1) included in the input record 106. Then, referring to FIG. 3, in block 310, the explanation computing device 302 (see FIG. 4) identifies one or more of the input variables 102 (see FIG. 1) as being of interest. For example, in block 310, all of the input variables 102 may be identified.

In block 315, the explanation computing device 302 (see FIG. 4) selects one of the input variables of interest. The explanation procedure 300 operates on a locality principle and modifies one of the input variables 102 (see FIG. 1) at a time. Referring to FIG. 1, because the model 100 may be non-linear, the effect of changing one of the input variables 102 is different depending on the overall context, i.e., the values of the other input variables that are left unchanged. In this sense, locality is based on limiting changes to one of the input variables 102 (see FIG. 1) at a time instead of using a linear approximation of the prediction surface or any type of distance metric, such as is used in LIME. For ease of illustration, in block 315, the explanation computing device 302 selects the input variable 121 (see FIG. 1).

Referring to FIG. 3, in block 320, the explanation computing device 302 (see FIG. 4) obtains sample values of the input variable selected in block 315 (e.g., the input variable 121). By way of a non-limiting example, the explanation computing device 302 may obtain the sample values from sample bins 322 (see FIG. 4). The sample values may be generated by a sample generation method 400 (see FIG. 6). Each of the sample values is associated with a prior probability, which estimates a probability that a randomly selected record will contain a value in the sample bin for the associated input variable.

Referring to FIG. 3, in block 325, the explanation computing device 302 (see FIG. 4) executes the model 100 (see FIG. 1) once for each of the sample values but uses the original value of each of the other input variables included in the input record 106 (see FIGS. 1 and 4). In other words, the value of the input variable selected in block 315 (e.g., the input variable 121) is changed but the values of all other input variables are left unchanged. Referring to FIG. 4, the explanation computing device 302 may execute the model 100 (see FIG. 1) by repeatedly calling the model execution engine 308 and passing it one of the sample values along with the values of the other input variables 102 (see FIG. 1) included in the input record 106. Thus, referring to FIG. 3, in block 325, the explanation computing device 302 (see FIG. 4) obtains sample predictions that are each associated with a different one of the sample values.

In block 330, the explanation computing device 302 (see FIG. 4) generates one or more metrics for the input variable selected in block 315 (e.g., the input variable 121) by comparing the sample predictions with the actual prediction 104. Optionally, the explanation computing device 302 stores the metric(s) (e.g., in a two-dimensional table). The metric(s) generated in block 330 may include one or more of the following:

1. A minimum ("Min") metric, which is the smallest predicted value expected from modifying the input variable and can optionally include the "Actual" value;
2. A maximum ("Max") metric, which the largest predicted value expected from modifying the input variable and can optionally include the "Actual" value;
3. A range, which is equal to a difference between the Max metric and the Min metric;
4. An upside metric, which equals the Max metric minus the Actual with values less than zero being truncated to zero and represents an amount of potential increase in predicted values expected by changing the input variable;
5. A downside metric, which equals the Actual minus the Min metric with values less than zero being truncated to zero and represents an amount of potential decrease in predicted values expected by changing the input variable;
6. An ExpectedUpside metric, which is equal to sum (probability(bin)*UpDifference), where the UpDifference equals (sampled(bin)−Actual) for all the bins where sampled(bin)>Actual and zero for all the bins where sampled(bin) Actual; and
7. An ExpectedDownside metric, which is equal to sum (probability(bin)*DownDifference) where the DownDifference equals (Actual−sampled(bin)) for all the bins where sampled(bin)<Actual and zero for all the bins where sampled(bin) Actual.

The actual prediction 104 (see FIG. 1) is referred to above as "Actual." Above, the term "bin" identifies the sample value selected from one of the sample bins 322 (see FIG. 4) and the term "sampled(bin)" is the sample prediction obtained for the sample value. As mentioned previously, each of the sample values is associated with a prior probability. Thus, by extension, each of the sample predictions is associated with the prior probability associated with the corresponding sample value. Above, the term "probability (bin)" is the prior probability associated with the sample value identified by the term "bin." Each of the above metrics generates a single value for the input variable from the sample predictions. The upside metric and the downside metric may each be non-negative as values (e.g., implemented as absolute values).

As mentioned above, the explanation procedure 300 may be used to explain why the prediction 104 (see FIG. 1) indicates the fail condition is likely to occur. In other words, the explanation procedure 300 may be used to explain why the prediction 104 is negative. By way of a non-limiting example, the negative result may indicate a high likelihood or probability of a default on a loan occurring. When this is the case, the downside metric is the metric of interest rather than the upside metric. However, the downside and upside metrics do not take into account the prior probabilities associated with the sample values. For example, if the input variable stores one of a plurality of categorical values, some of the categorical values may occur very infrequently and/or may be extreme values. Thus, the downside and upside metrics include a potential bias where those of the input variables 102 having more categorical values will tend to have larger downside and upside metrics, because of the underlying variance of the random variables. This effect is undesirable because the metrics should be comparable between different input variables without bias.

The ExpectedUpside and ExpectedDownside metrics use the prior probabilities to adjust the expected values, treating each of the input variables of interest as a discrete random variable. Those sample values that are unlikely based on the prior distribution of an original dataset are penalized. The original dataset may be the training data 110 and/or the test data 112 illustrated in FIG. 1.

Returning to FIG. 3, in block 330, the explanation computing device 302 (see FIG. 4) assigns the metric(s) to or associates the metric(s) with the input variable selected in block 315 (e.g., the input variable 121). Then, in decision block 335, the explanation computing device 302 (see FIG. 4) determines whether it has evaluated all of the input variables of interest. The decision in decision block 335 is "YES" when the explanation computing device 302 has evaluated all of the input variables of interest. Otherwise, the decision in decision block 335 is "NO."

When the decision in decision block 335 is "NO," the explanation computing device 302 (see FIG. 4) returns to block 315 and selects another one of the input variables of interest. On the other hand, when the decision in decision block 335 is "YES," the explanation computing device 302 (see FIG. 4) has collected the metric(s) for each of the input variables of interest and advances to block 340.

In block 340, the explanation computing device 302 (see FIG. 4) uses the metric(s) assigned to each of the input variables of interest in block 330 to identify the number "i" of the most influential input variables. For example, if the metric(s) include the ExpectedDownside metric, in block 340, the explanation computing device 302 may identify the number "i" (e.g., three) of the input variables of interest having the largest ExpectedDownside metrics as being the most influential variables. Referring to FIG. 4, the most influential input variables and their corresponding metric(s) are identified by reference numeral 342. At least a portion of those of the input variables of interest that are not identified as being most influential variables may be identified as or considered to be non-influential variables.

The metric(s) may be used to perform meaningful comparisons between continuous and categorical input variables, with or without missing and special values. For example, in block 340 (see FIG. 3), the explanation computing device 302 may weight or rank the input variables of interest based on the metric(s). When the input variables of interest are ranked, each input variable of interest appears only once in the ranking. For example, the explanation computing device 302 may rank the input variables of interest based on the ExpectedDownside metric calculated for each of the input variables of interest. In the unlikely event that the metric(s) assigned to two or more of the input variables of interest have the same value, meaning a tie has occurred, rankings may be assigned to the tied input variables randomly or using a configurable rule specified by a user. Thus, the ranks assigned may be unique for each of the input variables of interest.

In other words, each of the input variables of interest may be assigned a single rank and included only once in the ranking independently of the characteristics of the input variable. In such embodiments, the input variable is given a single rank when the input variable is a categorical independent variable. Additionally, the input variable is included only once in the ranking (and in an explanation 360 illustrated in FIG. 5) rather than once for each distinct value of the categorical input variable, which would be result of applying prior art methods, such as one hot encoding. Similarly, when the input variable is a continuous independent variable with no missing or special values, the input variable is given a single rank. Additionally, the input variable is included only once in the ranking (and in the explanation 360 illustrated in FIG. 5). Further, when the input variable is a continuous independent variable with missing or special values, the input variable is given a single rank, rather than one for the continuous values and one for each indicator variable that represents a missing or special value. Additionally, the input variable is included only once in the ranking (and in the explanation 360 illustrated in FIG. 5) rather than once for the continuous values of the input variable and once for each of the missing or special values of the input variable. Thus, independently of the characteristics and values of the input variable, the explanation procedure 300 may assign a single rank to the input variable and include the input variable only once in the ranking. These ranks allow meaningful comparisons between continuous and categorical variables, with or without missing and special values.

In optional block 345 (see FIG. 3), the explanation computing device 302 may identify one or more changes to the input variables of interest that would result in a more desirable prediction. In other words, the explanation computing device 302 may identify one or more corrective actions that can be taken. As mentioned above, the explanation procedure 300 (see FIG. 3) may be used to explain why the prediction 104 (see FIG. 1) is negative. By way of a non-limiting example, the negative result may indicate a high likelihood or probability of a default on a loan occurring. When this is the case, a user may be interested in whether the loan applicant can take actions to decrease the probability that the loan applicant will default. For example, when all of the sample values for a particular input variable that would result in a decreased chance of the negative result (e.g., a default) are extremely unlikely, that particular input variable is not ranked highly in terms of its potential for a corrective action.

By way of another example, the explanation computing device 302 is able to identify the values of the input variables of interest stored in the input record 106 (see FIG. 1) as being "too high," by examining the individual sample predictions produced in block 325 (see FIG. 3). In other words, the explanation computing device 302 is able to recognize that lower values exist that would increase the likelihood of a positive result. This is contrasted with other methods that have mathematical properties that do not provide these behaviors. For example, the rate of change in a localized linear approximation does not guarantee that explanations which are produced meet the attributes discussed above.

In optional block 347 (see FIG. 3), the explanation computing device 302 may identify text descriptions 500 for each of the most influential input variables identified in block 340. Referring to FIG. 4, in the example illustrated, the explanation computing device 302 stores a mapping 502 that maps each of at least a portion of the input variables 102 (see FIG. 1) to associated descriptive text. The explanation computing device 302 may use the mapping 502 to identify the text descriptions 500 in optional block 347 (see FIG. 3).

The text descriptions 500 may include or be associated with reason codes. A reason code may indicate a negative condition or reason for rejection. As will be described below with respect to a method 600 (see FIG. 12), the explanation procedure 300 (see FIG. 3) may be used to facilitate the creation of these reason codes (e.g., as applied in credit decision making or other industries). In other words, referring to FIG. 3, the explanation procedure 300 does not necessarily create reason codes, but rather facilitates and identifies those of the input variables of interest and metrics that should be used in those reason codes.

Figure 7:
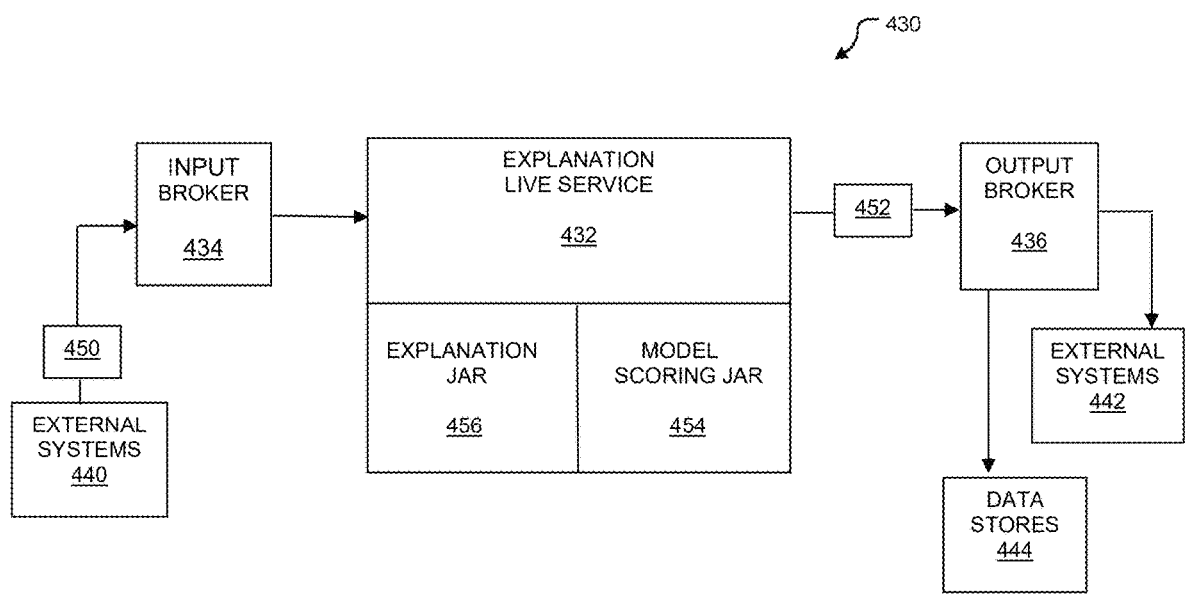
FIG. 7 is a block diagram of an exemplary system in which the explanation procedure of FIG. 3 may be practiced.

In block 350, the explanation computing device 302 (see FIG. 4) displays a graphical user interface 352 (see FIG. 5) including the explanation 360 (see FIGS. 4 and 5) to the user (e.g., a consumer, a loan applicant, and the like) on a display device (e.g., a monitor 47 illustrated in FIG. 13) and/or prints the explanation 360 using a printing device (not shown). Alternatively, the explanation 360 (see FIG. 5) may be input into another system (as shown in FIG. 7) and the explanation 360 may undergo further mapping to human readable text.

As mentioned above, in optional block 347, the text descriptions 500 (see FIG. 4) may be identified for each of the most influential input variables. In such embodiments, the explanation 360 (see FIG. 5) may include the text descriptions 500. As also mentioned above, the text descriptions 500 (see FIG. 4) may include the reason codes. Such an embodiment can be viewed as displaying output similar to the output produced by prior art scorecard technology, but unlike scorecard technology, the reason codes may be produced for any type of model (e.g., like the model 100 illustrated in FIG. 1).

Referring to FIG. 5, the explanation 360 may include identifiers 362 of the number "i" (e.g., three) of the most influential input variables, ranks 364 assigned to the most influential input variables, the actual prediction 104, and the metric(s) 366 associated with each of the most influential input variables. The explanation 360 may include an identifier 368 identifying the input record 106. Then, the explanation procedure 300 terminates.

Justifications

Referring to FIG. 4, in addition to displaying the explanation 360, the explanation computing device 302 (see FIG. 4) may display a graphical user interface 510 (see FIG. 8) on the display device or print a report using the printing device (not shown) that includes a justification of why the most influential input variables were determined to be more influential on the actual prediction 104 (see FIG. 1) than the non-influential input variables. The explanation computing device 302 may store a justification module 504, including computer-executable instructions, in the memory 306 configured to generate the graphical user interface 510 (see FIG. 8) and/or the report.

Figure 8:
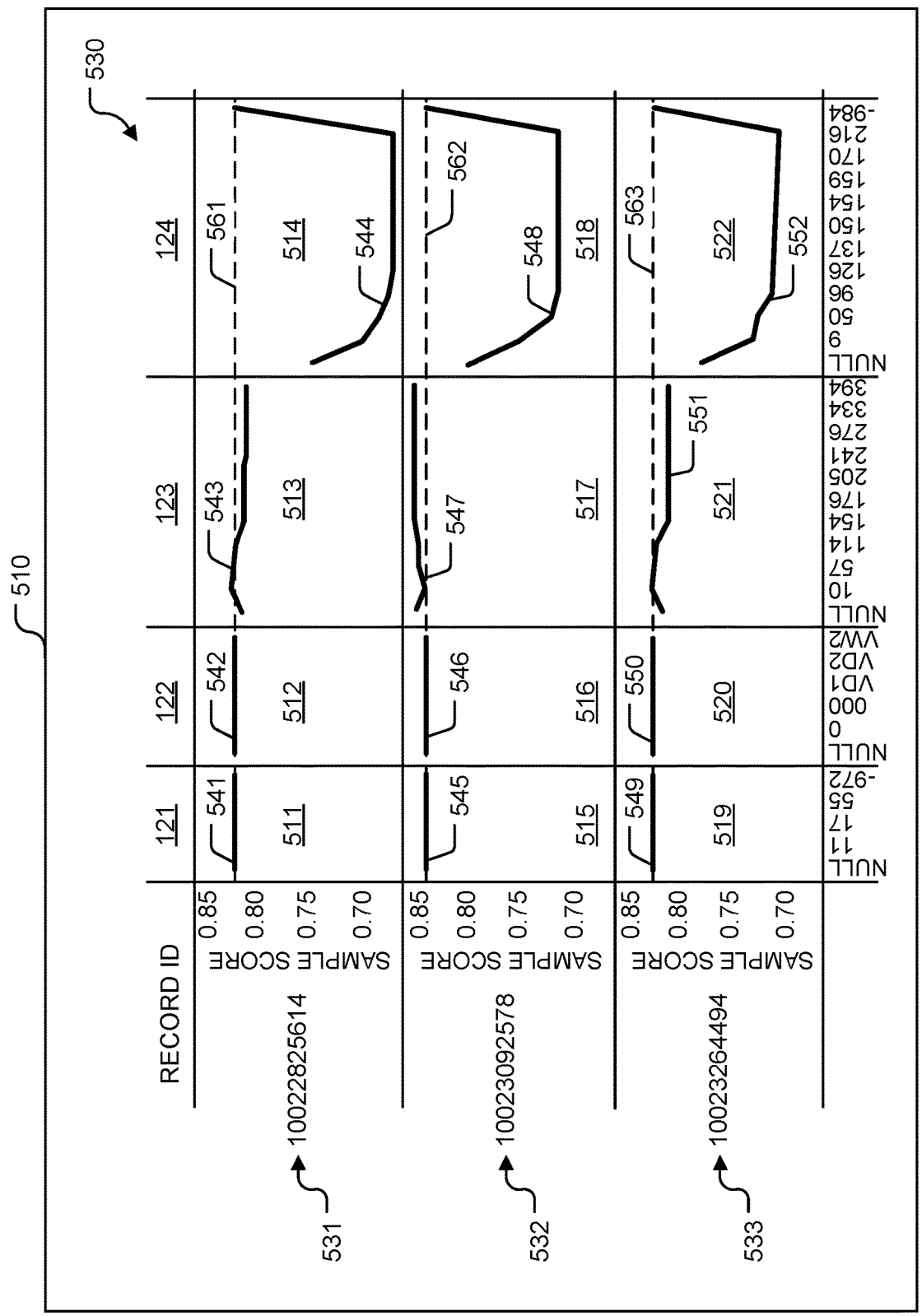
FIG. 8 is an exemplary computer generated visual representation of the justification for explanations generated for three records.

Referring to FIG. 8, the justification may include one or more plots or other graphical representations of the sample values and their corresponding sample predictions. FIG. 8 is an exemplary visual representation of justifications 530 produced by the justification module 504 (see FIG. 4) for explanations generated for three records 531-533 (e.g., corresponding to different customers) with values for the four input variables 121-124. Optionally, the explanations generated by the explanation procedure 300 (see FIG. 3) for the records 531-533 may be included along with the justifications 530. FIG. 8 includes twelve two-dimensional graphs 511-522. Solid lines 541-544 in the graphs 511-514, respectively, depict sample predictions obtained for the sample values of the input variables 121-124, respectively, for the first record 531. Solid lines 545-548 in the graphs 515-518, respectively, depict sample predictions obtained for the sample values of the input variables 121-124, respectively, for the second record 532. Solid lines 549-552 in the graphs 519-522, respectively, depict sample predictions obtained for the sample values of the input variables 121-124, respectively, for the third record 533. Dashed lines 561-563 represent the actual predictions produced by the model 100 (see FIG. 1) for the records 531-533, respectively.

In each of the graphs 511-522, the value along the x-axis represents the sample values of one of the input variables 121-124 and the value along the y-axis represents the sample predictions produced by the model 100. The graphs 511, 515, and 519 depict the sample predictions obtained for the sample values of the input variable 121. In the example illustrated, the sample values of the input variable 121 include values "NULL," 11, 17, 55, and −972. Thus, the input variable 121 is a continuous independent variable with special values "NULL" and −972. The graphs 512, 516, and 520 depict the sample predictions obtained for the sample values of the input variable 122. In the example illustrated, the sample values of the input variable 122 include values "NULL," 0, 000, VD1, VD2, and VW2. Thus, the input variable 122 is a categorical independent variable. The graphs 513, 517, and 521 depict the sample predictions obtained for the sample values of the input variable 123. In the example illustrated, the sample values of the input variable 123 include values "NULL," 10, 57, 114, 154, 176, 205, 241, 276, 334, and 394. Thus, the input variable 123 is a continuous independent variable with special value "NULL." The graphs 514, 518, and 522 depict the sample predictions obtained for the sample values of the input variable 124. In the example illustrated, like the input variable 121, the input variable 124 is a continuous independent variable with special values "NULL" and −984.

As mentioned above, a different sample value may be obtained for each sample bin. Thus, in the example illustrated, the input variables 121-124 have differing numbers of bins. For example, the input variables 121-124 illustrated have five, six, eleven, and twelve bins, respectively.

In regulated and high accountability industries, the explanation procedure 300 (see FIG. 3) itself of generating the explanation 360 (see FIGS. 4 and 5) undergoes high scrutiny, because the explanation procedure 300 must be justifiable to regulators and governing bodies as well as potentially intuitive to consumers and individuals who are impacted by decisions driven by the predictions made by the model 100 (see FIG. 1). FIG. 8 shows examples of the justifications 530, which are supporting evidence for the explanations and can be understood visually without understanding complex mathematical equations or heuristics.

Because the impact of changes to one of the input variables 121-124 are evaluated independently, the two-dimensional graphs 511-522 are sufficient to show the impacts of changes to the input variables 121-124. In the example illustrated, the y-axis represents the approximate probability of a negative future event, as predicted by the model 100 (see FIG. 1). As shown in FIG. 8, the graphs 511-514 for the first record 531 may share a common y-axis. Similarly, the graphs 515-518 for the second record 532 may share a common y-axis and the graphs 519-522 for the third record 533 may share a common y-axis. Thus, for each of the records 531-533, changes to each of the input variables 121-124 may be viewed along the same y-axis. Further, as shown in FIG. 8, the y-axis may be identical for each of the records 531-533, which allows the sample predictions to be compared across multiple records.

In the example illustrated in FIG. 8, for the records 531 and 533, changes to the input variable 124 have the largest effect and changes to input variable 123 have the second largest effect on the value of the prediction. In fact, setting the input variable 124 equal to any value other than −984 reduces the probability of a negative future event, as predicted by the model 100 (see FIG. 1). On the other hand, changes to the input variables 121 and 122 have little to no effect on the value of the prediction. Thus, the explanation generated for the record 531 (for example) would identify the input variables 123 and 124 as being most influential input variables. By merely looking at the graphs 511-522, one can immediately determine which of the input variables 121-124 have the greatest impact on a particular prediction generated by the model 100. In other words, these visualizations help justify a particular explanation (like the explanation 360 illustrated in FIG. 5). This is a powerful justification method that does not require regulators, consumers, or other stakeholders to interpret complex math. Other methods of justifying a particular explanation include examining the data used to produce the graphs 511-522 or similar visualizations, examining the metrics derived from that data, and the like.

Changing Model Results

Referring to FIG. 3, in addition to explaining why a particular prediction results from the values of the input variables, in optional block 345, the explanation procedure 300 may also offer insight as to how that particular prediction may be changed (e.g., from negative to positive). For example, in some regulated industries, the upside and downside metrics may be used to measure the ability to remediate against a negative decision. For example, a particular prediction may be the probability that a consumer will fail to meet contractual obligations. In standard practice, a high probability will likely result in a negative action against the consumer, such as a rejection of a consumer loan application. Given this context, the downside and/or upside metrics may be appropriate and used to represent a capacity of the consumer to improve the consumer's likelihood of acceptance.

As mentioned above, in FIG. 8, changes to the input variables 121 and 122 have almost no effect on the value of the prediction. Thus, the solid lines 541, 542, 545, 546, 549, and 550 are horizontal. Further, the solid lines 541 and 542 are collinear with the dashed line 561, the solid lines 545 and 546 are collinear with the dashed line 562, and the solid lines 549 and 550 are collinear with the dashed line 563. For the input variable and record combinations where the solid line is horizontal, changes to that input variable have no impact on the prediction produced by the model 100. Thus, it can be inferred that changing those input variables will have little to no impact on the downside metric. In other words, the downside metric (which is Actual minus the Min prediction) is approximately equal to 0.0 for those input variables. In optional block 345 (see FIG. 3), the explanation computing device 302 (see FIG. 4) may determine automatically that changes to the values of those input variables having a horizontal line will not change the prediction. Therefore, in optional block 345, the explanation computing device 302 (see FIG. 4) will not identify changes to the input variables as changing the prediction.

Turning to the graph 517, the downside metric for the second record 532 and the input variable 123 is also approximately equal to 0.0, but for less obvious reasons. In this case, when the input variable 123 has a value of 10, the sample prediction is equal to the actual prediction illustrated by the dashed line 562. All the other possible values for the input variable 123 increase the likelihood of failure to meet contractual obligations, so there is no benefit to adjusting the input variable 123. Thus, the actual prediction (Actual) is equal to the minimum (Min) prediction and the downside metric is equal to zero. In terms of regulatory reporting intended to help consumers understand how to remediate their circumstances, it could be considered misleading to report the input variable 123 as being an influential variable to a consumer, because no changes can be made by the consumer to the input variable 123 that will increase the likelihood of the consumer being accepted. This property differentiates the present explanation methods from other prior art explanation techniques that use a heuristic or mathematical notion of local change to ascribe weight to variables in explanations. For example, these prior art methods might consider the input variable 123 to be important because modification of values in the neighborhood of the actual value result in a change to the prediction. In other words, such prior art methods fails to consider whether the change to the prediction is relevant or irrelevant to the ultimate decision based on the predictions made by the model 100 (see FIG. 1). Note that although this property is being demonstrated in terms of a procedure that uses simulation and/or sampling to approximate the underlying prediction surface, the same principle can be applied to other methods of generating explanations. For example, given a known equation for the prediction surface, deterministic methods could be used to derive the properties needed to apply this principle.

In optional block 345 (see FIG. 3), the explanation computing device 302 (see FIG. 4) may determine automatically that changes to the value of the input variable 123 will not change the prediction for the second record 532 in a desired manner. Therefore, in optional block 345, the explanation computing device 302 (see FIG. 4) will not identify changes to the input variable 123 as changing the prediction for the second record 532.

The input variable 123 also demonstrates that this explanation procedure 300 (see FIG. 3) may be used to produce explanations and justifications for non-linear models. Even though the explanation procedure 300 itself evaluates changes to the input variables one a time, the other input variables can place the sample predictions in different locations on the n-dimensional prediction surface (e.g., the prediction surface 220 illustrated in FIG. 2). Thus, each of the three records 531-533 shows a different two-dimensional slice (depicted by the solid lines 543, 547, and 551, respectively) of the n-dimensional prediction surface, with the input variables that are not being changed establishing the positioning of that slice on the prediction surface. In FIG. 8, the underlying model 100 (see FIG. 1) is nonlinear and has interactions between the input variable 123 and the other input variables 121, 122, and 124. This is demonstrated by the different shapes of the solid lines 543, 547, and 551 produced for the records 531-533, respectively. On the other hand, if the underlying model 100 was linear, the shape of the two-dimensional slices (depicted by the solid lines 543, 547, and 551) of the prediction surface would be the same across the records 531-533, although the slices might be offset higher and/or lower with respect to one another on the y-axis.

In FIG. 8, the solid lines 543 and 551 show downside metric values that are positive when the value of the input variable 123 is greater than 114 or less than 10, even though the solid line 547 has a downside metric approximately equal to 0.0. In other words, to understand the influence of the input variable 123, it may be helpful to look across multiple records. In this case, by looking at the graphs 513, 517, and 521, one can understand that by changing the value of the input variable 123, it is possible to change (e.g., reduce) the prediction generated by the model 100. When the model 100 produces the probability that a consumer will fail to meet contractual obligations, the graphs 513, 517, and 521 accurately represents the capability of the consumer to mitigate the consumer's circumstances through changing the value of the input variable 123 alone, based on their overall circumstances and the predictions of the non-linear model 100. This analysis may be performed using the training data 110 and/or the test data 112 illustrated in FIG. 1 before the model 100 is deployed.

In optional block 345 (see FIG. 3), the explanation computing device 302 (see FIG. 4) may determine automatically that changes to the value of the input variable 123 will change the prediction for the first and third records 531 and 533 in a desired manner. Therefore, in optional block 345, the explanation computing device 302 (see FIG. 4) will identify changes to the input variable 123 as changing the prediction for the first and third records 531 and 533.

The explanation procedure 300 (see FIG. 3) applies a single variable improvement principle that has two parts. First, the explanation procedure 300 returns a smallest value (or least significant value) when any of the changes to a single input variable do not result in an improvement in the prediction 104 made by the model 100. As explained above with respect to the graph 517, the downside metric will have the smallest value (e.g., zero) even though the input variable 123 influences the value of the prediction because the sample predictions are evaluated relative to a starting point, namely the actual prediction (illustrated by the dashed line 562). Second, the explanation procedure 300 (see FIG. 3) does not return the smallest value (or the least significant value) when any changes to a single input variable results in an improvement in the prediction made by the model 100. Although, the explanation produced by the explanation procedure 300 may include inaccuracies (e.g., caused by sampling or other approximations), these two parts of the principle should apply if the sampling fidelity is increased to infinity or to the maximum amount possible. Smoothing methods may be applied when evidence is insufficient to support a specific prediction for an input variable. For example, smoothing may be used when a specific categorical value occurs very infrequently or where it is desirable to smooth away the impact of noise. This principle may be applied in the context of general-purpose methods, such as methods, like the explanation procedure 300, that can be applied to more than one machine learning algorithm.

Referring to FIG. 1, improving the prediction 104 of the model 100 may be characterized as improving an end result for an actor (e.g., a consumer). For example, the prediction 104 may be a likelihood that a consumer applying for credit will default on repaying the credit. An example of an improvement to the actor is a reduction in the likelihood that the consumer will default on repaying the credit. If the likelihood of default is reduced, the end result may be that an entity grants the credit to the consumer. If zero is the smallest value and positive values indicate improvements to a consumer's situation, zero may be returned when there are no possible changes to a single input variable that reduce the consumer's likelihood of being rejected. Otherwise, a positive value may be returned.

As mentioned above, referring to FIG. 8, the solid line 547 illustrates that there is no benefit to adjusting the input variable 123 for the record 532. An example of a method that violates the single variable improvement principle is a method that returns a positive value for the input variable 123 for the record 532. The positive value may be justified because there is mathematically or heuristically a local change around the actual value of the input variable 123. However, continuing the example above, none of these changes benefit the consumer in any way but instead increase their likelihood of rejection. So although the input variable 123 may be influential in terms of its numeric impact on the prediction (e.g., probability), it is not influential in terms of its ability to rectify this particular rejection event.

Thus, the input variable 123 may be determined to be of interest (e.g., in block 310 of FIG. 3) because a possibility exists that changes to the value of the input variable 123 could improve the end result for a particular actor (e.g., a consumer). However, in block 340 of FIG. 3, the explanation computing device 302 (see FIG. 4) would not rank the input variable 123 very high for the record 532. Additionally, in optional block 345 of FIG. 3, the explanation computing device 302 (see FIG. 4) would not identify changes to the input variable 123 as a way to improve the prediction (illustrated by the dashed line 562 in FIG. 8) made for the record 532. On the other hand, in block 340 of FIG. 3, the explanation computing device 302 (see FIG. 4) would rank the input variable 123 more highly for the records 531 and 533. Additionally, in optional block 345 of FIG. 3, the explanation computing device 302 (see FIG. 4) may identify changes to the input variable 123 as a way to improve the predictions (illustrated by the dashed lines 561 and 563 in FIG. 8) made for the records 531 and 533. In this manner, explanations are customized for each of the records 531-533.

Input Variables of Interest

Referring to FIG. 4, the explanation computing device 302 may store a variables of interest module 506, including computer-executable instructions, in the memory 306. A useful property of explanation generation when applied to practical problems is that it can become unnecessary to compute sample values and corresponding sample predictions for all of the input variables. For example, to satisfy certain regulatory requirements, it may be necessary to report only the top five most influential input variables in the explanation for each record. This has the practical implication that the explanation procedure 300 (see FIG. 3) may be applied to all of the records within a test dataset (e.g., the training data 110 and/or the test data 112 illustrated in FIG. 1) and the explanations generated for these records may be used to determine how frequently each of the input variables appears ranked within the top five results. Given a sufficiently large training dataset, it can be assumed that input variables that never appear ranked in the top five will also never appear in the test or production datasets, with a vanishingly small probability as the number of records increases and based on the assumption that the training and test datasets are drawn from the same underlying population, which can be monitored live through other techniques. Given these assumptions, it may be necessary to compute explanations for only a fraction of the overall input variables, reducing computational complexity.

Figure 9:
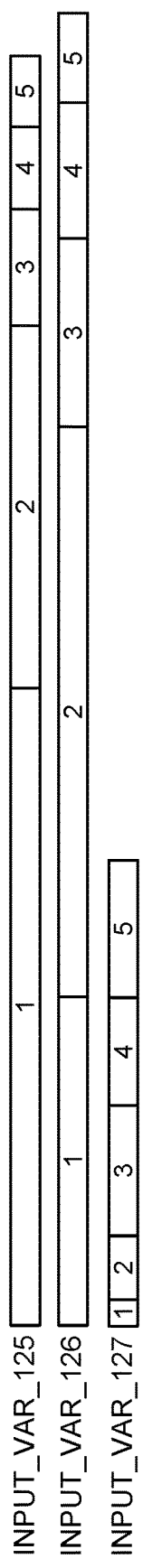
FIG. 9 is a computer generated visualization illustrating a number of times that each of three different input variables was assigned a rank 1-5 for a set of records within a test dataset.

As mentioned above, the input variables may be ranked by the explanation procedure 300 (see FIG. 3). FIG. 9 is a visualization of the computation of the number of times that the input variables 125-127 each appears in a ranked position (or is assigned a rank 1-5) for the records within a set of test data (e.g., like the test data 112 of FIG. 1). In FIG. 9, a length of each of bars corresponds to a number of records for which the input variable was assigned the rank indicated. For example, the input variable 125, which is labeled "INPUT_VAR_125" in FIG. 9, was assigned the rank 1 more times than the other input variables 126 and 127 illustrated. The information used to generate FIG. 9 may be used by the variables of interest module 506 (see FIG. 4) to derive a global measure of variable importance, such as a count of times that an input variable is assigned the rank 1 or a count of times that an input variable is assigned the rank 1, 2, or 3. For example, in FIG. 9, the input variable 126, which has the longest bar, was assigned one of the ranks 1-5 the greatest number of times.

As mentioned above, in block 310 (see FIG. 3), the explanation computing device 302 (see FIG. 4) identifies one or more of the input variables 102 (see FIG. 1) as being of interest. Thus, in block 310, the explanation computing device 302 may select only those of the input variables 102 having a value for the global measure of variable importance that exceeds a threshold value. Alternatively, the explanation computing device 302 may select only a predetermined number of the input variables 102 with the largest values for the global measure of variable importance.

Variable importance measures the impact of each input variable across the entire dataset and is often used to decide which input variables to include in a model during the model development process. Explanations rank the input variables of interest based on their impact to individual predictions, which lead to decisions. Explanations can be used to provide feedback to individual users or consumers during live processes. Individual explanations can also be aggregated to form global measures of importance or to provide measures of importance for different partitions of the population. For example, the data can be partitioned into different groupings of rejected populations, from those that are rejected most strongly to those that are rejected less strongly. These groupings can show systematic patterns as to what factors are causing these groups of individuals to be rejected. This information can be useful for the purpose of accountability in decision making as well as providing a greater understanding of model behavior.

Figure 10:
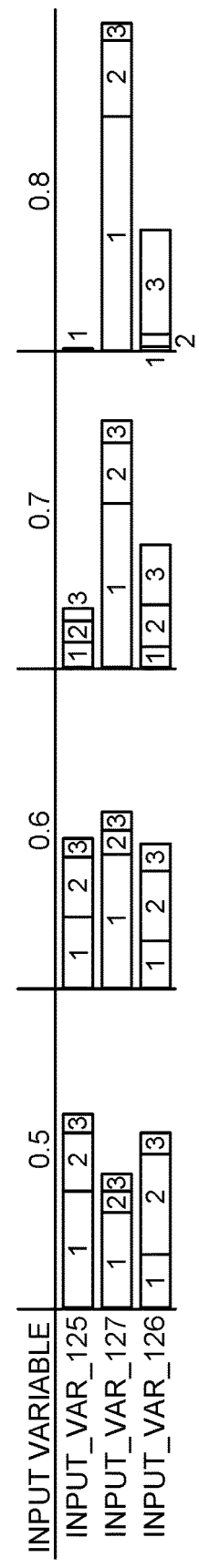
FIG. 10 is a first computer generated visualization illustrating explanations divided into score bins that were created based on actual predictions.

In FIGS. 10 and 11, the actual predictions are grouped into score bins. FIGS. 10 and 11 show two different visualizations of model behavior for different score bins. In the example illustrated in FIG. 10, the score bins include 0.5, 0.6, 0.7, and 0.8. Thus, if the actual prediction is 0.75 for a particular record, the input variables ranked in the explanation for the particular record would be counted in the score bin 0.7. For ease of illustration, in FIGS. 10 and 11, the input variables were assigned ranks by the explanation procedure 300 (see FIG. 3). In the visualizations illustrated in FIGS. 10 and 11, the rank refers to the ranking of the input variables using the selected metric (such as the downside metric) and counts (illustrated by length of bars in FIG. 10) for those records falling within the appropriate score bin. In prior work, explanations were presented either at the global or individual level, but not for partitions of the records (e.g., each corresponding to an individual).

Sample Generation Method

Figure 6:
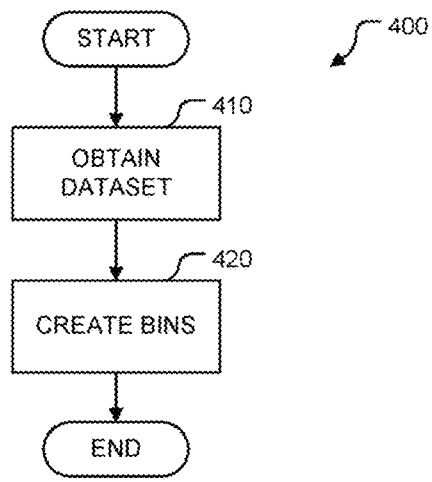
FIG. 6 is a flow diagram of a sample generation method performed by the explanation computing device of FIG. 4.

FIG. 6 is a flow diagram of the sample generation method 400 that may be performed by the explanation computing device 302 (see FIG. 4 and may be stored in the computer-executable instructions 304 (see FIG. 4)). Referring to FIG. 1, to generate the sample values in a live environment, some amount of information may be pre-computed based on an original dataset (e.g., the training data 110 and/or the test data 112). Thus, the sample generation method 400 (see FIG. 6) may be performed before the model 100 is deployed.

The explanation computing device 302 (see FIG. 4) performs the sample generation method 400 (see FIG. 6) for each of the input variables 102 separately. For ease of illustration, the sample generation method 400 (see FIG. 6) will be described as being performed on the input variable 121.

Referring to FIG. 6, in first block 410, the explanation computing device 302 obtains the original dataset (e.g., the training data 110 and/or the test data 112 illustrated in FIG. 1). The original dataset includes values of the input variable 121 (see FIG. 1).

Next, in block 420, the explanation computing device 302 creates the sample bins 322 (see FIG. 4) for the input variable 121 (see FIG. 1). The explanation computing device 302 may create the sample bins 322 (see FIG. 4) for the input variable 121 by dividing the values of the input variable 121 stored in the original dataset into a number of bins. The values are divided in a manner that at least approximates a probability distribution of the values of the input variable 121 in the original dataset. The number of bins may be entered by a user or determined automatically by the explanation computing device 302. By way of a non-limiting example, the bins may be created using a histogram or similar technique.

In block 420, the explanation computing device 302 uses discrete values to approximate a potentially continuous, infinite range of values. The bins represent a range of values that approximate the distribution of values from the original dataset. Thus, the explanation computing device 302 avoids using values that are outside of the bounds of the original dataset. It is undesirable to use values that are outside of the bounds of the input variable because the model 100 may not be tested in these ranges and the ranges are unlikely to be feasible so they may lead to poor or incorrect explanations. The bins provide a uniform method for handling continuous and categorical input variables, so both types of variables can be compared using the same metric. Also, the bins allow uniform handling of the case where special or missing values are present for continuous variables, i.e., where the input variable 121 is both continuous and categorical.

In block 420, the explanation computing device 302 treats the input variable 121 as a random variable representing a prior distribution of that variable alone. By placing the values of the input variable 121 into the bins, the explanation computing device 302 treats the input variable 121 as a discrete random variable. The explanation computing device 302 places each categorical value (string, integer value, numeric code, etc.), including missing or special values, in its own bin. The explanation computing device 302 places continuous values in bins according to their quantiles. The number of quantiles may be a configurable parameter (e.g., supplied by the user).

The explanation computing device 302 may divide the values into bins with equal probability. In doing so, the explanation computing device 302 may approximate a large number of underlying distributions, including non-normal distributions. Alternatively, the explanation computing device 302 may divide the values using z-scores. However, using z-scores may tend to perform poorly in non-normal distributions and with outliers.

Each bin stores one or more values and an associated prior probability. For example, each bin may store either a categorical value for a categorical input variable or a range of values for a continuous input variable. The range may be open-ended or unbounded on one side (e.g., <1, >10, and the like). Alternatively, the range may be bounded on both sides by a smallest value and a largest value (e.g., 1≥ and ≤10).

Then, the sample generation method 400 terminates.

Referring to FIG. 3, in block 320 of the explanation procedure 300, the explanation computing device 302 (see FIG. 4) selects the sample values from the bins. For example, the explanation computing device 302 may select one sample value from each of the bins for the input variable 121 (see FIG. 1). Referring to FIG. 4, for those bins that contain a categorical value, the explanation computing device 302 selects that single categorical value as the sample value. For those bins that contain a bounded continuous range, the explanation computing device 302 may select a mid-point of the range as the sample value. Alternatively, the explanation computing device 302 may generate a random value within the bin. However, doing so may lead to less consistent and/or stable explanations. For bins that are unbounded on one side, the explanation computing device 302 may select the bounded value (either high or low as appropriate) as the sample value. The explanation procedure 300 (see FIG. 3) may use a static definition of the sample values to provide consistent results at runtime instead of a stochastic selection.

Text Description Mapping

Figure 12:
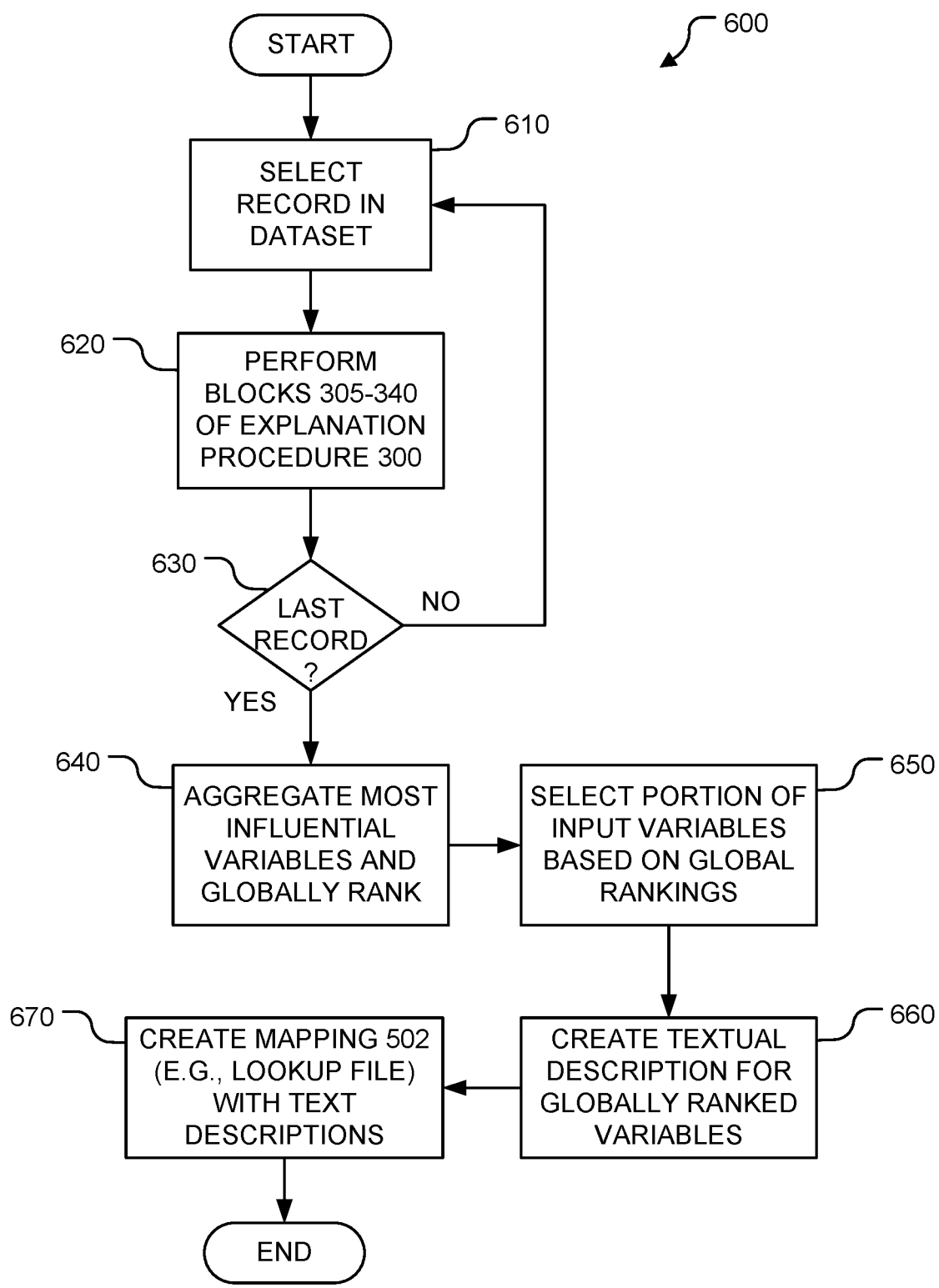
FIG. 12 is a flow diagram of a method of creating text descriptions performed by the explanation computing device of FIG. 4.

FIG. 12 is a flow diagram of the method 600 that may be performed by the explanation computing device 302 of FIG. 4. In such embodiments, the explanation computing device 302 may store a text description module 508, including computer-executable instructions, in the memory 306. The text description module 508 is configured to cause the explanation computing device 302 to perform the method 600 (see FIG. 12).

Referring to FIG. 12, in first block 610, the explanation computing device 302 (see FIG. 4) selects a record in a representative dataset (e.g., the training data 110 illustrated in FIG. 1). Then, in block 620, the explanation computing device 302 performs blocks 305-340 (see FIG. 3) of the explanation procedure 300 (see FIG. 3) with respect to the record selected in block 610.

Next, in decision block 630, the explanation computing device 302 (see FIG. 4) determines whether it has selected all of the records in the representative dataset. The decision in decision block 630 is "YES" when the explanation computing device 302 has selected all of the records in the representative dataset. Otherwise, the decision in decision block 630 is "NO."

When the decision in decision block 630 is "NO," the explanation computing device 302 returns to block 610 and selects the next record in the representative dataset. On the other hand, when the decision in decision block 630 is "YES," in block 640, the explanation computing device 302 assigns global rankings to the input variables 102 (see FIG. 1) across all of the records in the representative dataset. For example, if the explanation procedure 300 (see FIG. 3) assigned ranks to the input variables 102 in block 340 (see FIG. 3), the explanation computing device 302 may aggregate the ranks assigned to the input variables 102 (see FIG. 1) and count a number of times each of the input variables 102 (see FIG. 1) was assigned each of the rankings (e.g., as depicted FIGS. 9-11). These counts may be used to assign the global rankings to the input variables 102 (see FIG. 1) in block 640.

Next, in block 650, the explanation computing device 302 (see FIG. 4) selects a portion of the input variables 102 (see FIG. 1) based on their global rankings. It is possible to create textual descriptions for every input variable, but depending on the use case, it may be necessary to create text descriptions for only those of the input variables 102 that were assigned a rank with a predetermined range (e.g., ranks 1-20) with respect to at least one of the records.

In block 660, the explanation computing device 302 (see FIG. 4) obtains text descriptions for the portion of the input variables 102 (see FIG. 1) selected in block 650. For example, the explanation computing device 302 (see FIG. 4) may automatically determine that a variable "X" is too large and may create a text description "too high" for the variable "X." Similarly, the explanation computing device 302 (see FIG. 4) may determine that a variable "Y" is too small and may create a text description "too low" for the variable "Y." The explanation computing device 302 (see FIG. 4) may automatically determine that the variable "X" is too large and the variable "Y" is too small by comparing their actual values one at a time to values of the variables "X" and "Y" that improve the prediction. By way of another non-limiting example, in block 660, the explanation computing device 302 (see FIG. 4) may display the input variables to a user and the user may enter the text descriptions. For example, the user may enter the text description "too high" next to the variable "X" and the text description "too low" next to the variable "Y."

In block 670, the explanation computing device 302 (see FIG. 4) maps the input variables selected in block 650 to the text descriptions. In other words, in block 670, the explanation computing device 302 (see FIG. 4) creates the mapping 502 (see FIG. 4). The mappings 502 may be stored in a separate lookup file. Then, the method 600 terminates.

Thus, the method 600 creates the text descriptions based on a comparison of the rankings generated by the explanation procedure 300 (see FIG. 3) and creates the mappings 502 (see FIG. 4) used in the explanation procedure 300. As mentioned above, referring to FIG. 4, in block 320 (see FIG. 3) of the explanation procedure 300 (see FIG. 3), the explanation computing device 302 may display the text descriptions 500 (e.g., "Variable X is too high," "Variable Y is too low," etc.) to the user.

Example Embodiments

Referring to FIG. 3, the explanation procedure 300 may be used when the model 100 (see FIG. 1) is configured to help make credit decisions. For example, the prediction 104 (see FIG. 1) may indicate whether an individual is likely to default on a loan. When the individual is likely to default, the explanation procedure 300 may be used to identify which of the input variables 102 (see FIG. 1) resulted in the prediction 104 (see FIG. 1). For example, referring to FIG. 4, the text descriptions 500 may be used to identify reasons why an individual is likely to default on a loan. The text descriptions 500 may be included in the explanation 360 so that the explanation 360 is human readable and interpretable.

Alternatively, the explanation procedure 300 may be used when the model 100 (see FIG. 1) is configured to determine a likelihood that fraud is occurring or about to occur. Likewise, the explanation procedure 300 may be used in other areas, such as marketing and so on.

Referring to FIG. 7, the explanation procedure 300 may be used to interface between to multiple scoring engines (e.g., each like the model execution engine 308 illustrated in FIG. 4), for example for models produced with H2O, Spark MLLib, Spark MLLeap, PMML execution engines, or other model scoring engines. As mentioned above, the explanation procedure 300 (see FIG. 3) may use Spark Streaming and Kafka technologies to ingest the input record 106 (see FIGS. 1 and 4) in a streaming manner and produce an explanation in a streaming manner.

FIG. 7 illustrates an exemplary system 430 that may be used to implement the explanation procedure 300. By way of a non-limiting example, the explanation procedure 300 may be embedded into an explanation live process or service 432 for the purpose of providing explanations along with a live accept/reject decision. Scalability may be achieved through multiple mechanisms. For example, the system 430 includes an input message broker 434 and an output message broker 436. The input and output message brokers 434 and 436 allows a pool of distributed machines to handle messages and de-coupling the explanation live service 432 from any producers of records (e.g., one or more external systems 440) or consumers of explanations (e.g., one or more external systems 442). The external system(s) 440 may be the same as or different from the external system(s) 442. The input message broker 434 receives a message 450 including a record from the external system(s) 440 (e.g., external credit systems) and sends to the message 450 to the explanation live service 432. The output message broker 436 receives a message 452 including the explanation (e.g., the explanation 360 illustrated in FIG. 5) from the explanation live service 432 and forwards the message 452 to one or more data stores 444 and/or the external system(s) 442. For example, the message 452 and/or the explanation may be stored in a stored in the data store(s) 444 (e.g., a permanent data store) and/or provided to the external system(s) 442 as a live downstream UI presentation with no change to the explanation live service 432. By way of a non-limiting example, Kafka may be used as both the input and output message brokers 434 and 436. The explanation live service 432 may be embedded in a Spark Streaming framework, allowing low latency responses and scalability of processing explanations across multiple processors on a single node or distributed across multiple nodes on a network. When Kafka and Spark Streaming are combined, some guarantees of message delivery can be configured. The system 430 may include a model scoring jar file 454 that provides access to the model 100 by the explanation live service 432. The model 100 may be implemented using different model executions, such as those provided by JPMML, H₂O, MLeap, and the like. The system 430 may include an explanation jar file 456 that is accessible by the explanation live service 432 and may store custom compiled code and artifacts used to execute the model 100 (see FIG. 1).

Computing Device

Figure 13:
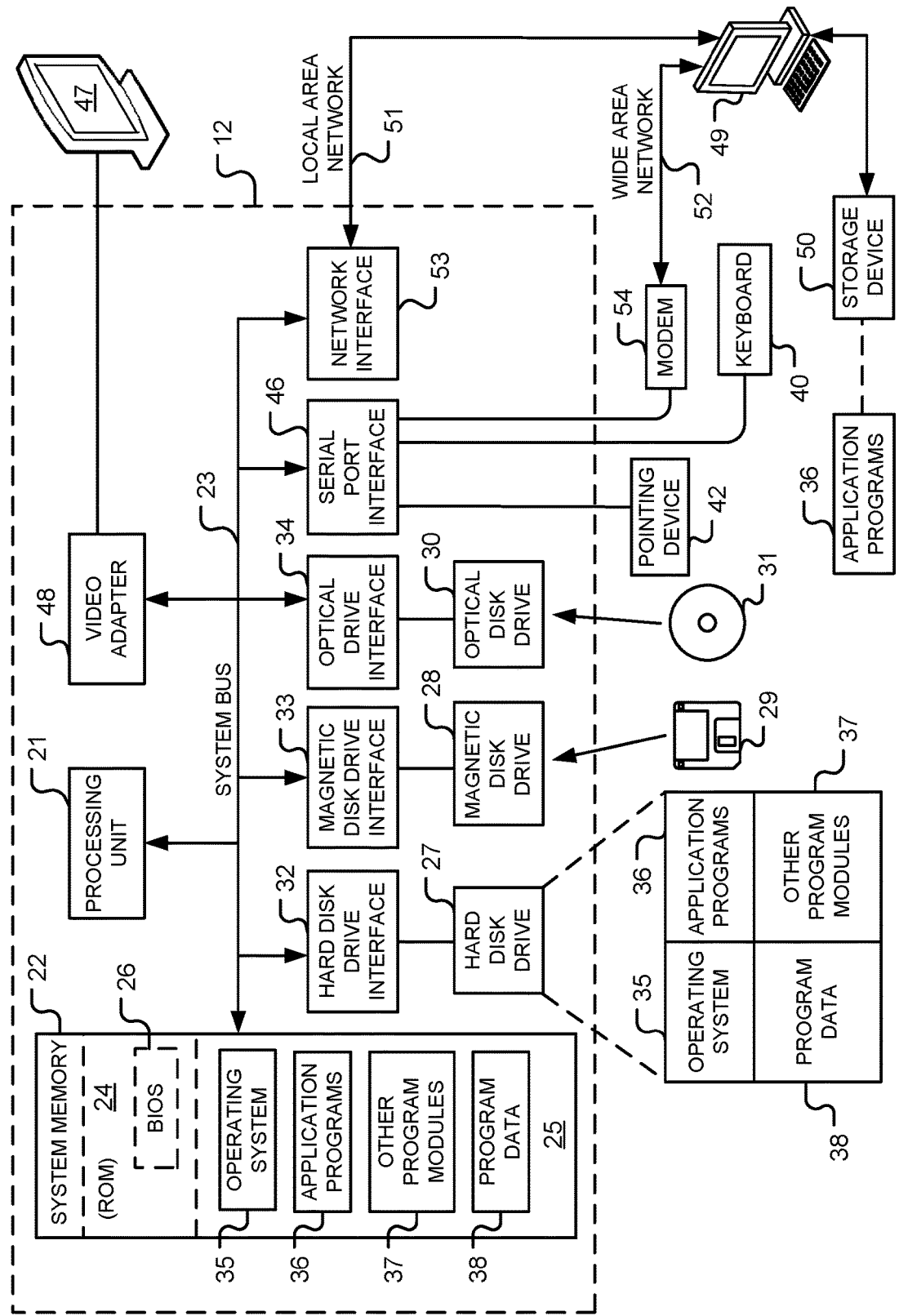
FIG. 13 is a diagram of a hardware environment and an operating environment in which the explanation computing device of FIG. 4 may be implemented.

FIG. 13 is a diagram of hardware and an operating environment in conjunction with which implementations the explanation computing device 302 (see FIG. 4) and/or the system 430 (see FIG. 7) may be practiced. The description of FIG. 13 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 13 includes a general-purpose computing device in the form of the computing device 12. The explanation computing device 302 (see FIG. 4) may be substantially identical to the computing device 12. The system 430 (see FIG. 7) may include one or more computing devices each like the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes the system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). The monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 13 include a local-area network (LAN) 51 and a wide-area network (WAN) 52. Such networking environments are commonplace in offices, enterprise-wide computer networks, intranets and the Internet.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the explanation procedure 300, the sample generation method 400, and the method 600 illustrated in FIGS. 3, 6, and 12, respectively) described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

What is claimed:
1. A computer-implemented method, comprising:
 obtaining an original dataset, wherein the original dataset is used to train a machine learning model prior to deployment of the machine learning model, and wherein the original dataset includes different sets of values corresponding to different input variables;

generating different sets of sample bins corresponding to the different input variables, wherein the different sets of sample bins are generated according to a probability distribution of the different sets of values;

repeatedly processing the different sets of values from the different sets of sample bins through the machine learning model to generate a set of sample predictions, wherein processing includes using a set of values from a set of sample bins corresponding to an individual input variable and original values corresponding to other input variables from the original dataset, as input to the machine learning model;

identifying a set of influential input variables from the different input variables by comparing the set of sample predictions to an actual prediction, wherein the actual prediction is generated by processing the original dataset through the machine learning model;

receiving a request to generate a prediction from an input record, wherein the input record includes the different input variables and different sets of actual values corresponding to the different input variables;

updating the input record by modifying one or more actual values corresponding to the set of influential input variables, wherein the one or more actual values are modified by selecting a subset of sample values from a set of sample bins corresponding to the set of influential input variables; and processing the updated input record through the machine learning model to generate the prediction.

2. The computer-implemented method of claim 1, further comprising:
providing a justification for identification of the set of influential input variables, wherein the justification includes the set of sample predictions.

3. The computer-implemented method of claim 1, wherein the different sets of sample bins are further defined according to different bounds associated with the different sets of values from the original dataset.

4. The computer-implemented method of claim 1, wherein the different sets of values are associated with corresponding prior probabilities, and wherein a prior probability estimates a probability that a randomly selected input record contains a value from a set of values.

5. The computer-implemented method of claim 1, further comprising:
mapping the set of influential input variables to a set of text descriptions; and
providing the set of text descriptions.

6. The computer-implemented method of claim 1, wherein the actual prediction indicates a likelihood that fraud is about to occur, and wherein the set of influential input variables is identified based on a reduction in a likelihood of the fraud occurring.

7. The computer-implemented method of claim 1, further comprising:
generating a set of visualizations based on the set of sample predictions and the actual prediction, wherein the set of visualizations provides a justification for the set of influential input variables; and
providing the set of visualizations.

8. A system, comprising:
one or more processors; and
memory storing thereon instructions that, as a result of being executed by the one or more processors cause the system to:
obtain an original dataset, wherein the original dataset is used to train a machine learning model prior to deployment of the machine learning model, and wherein the original dataset includes different sets of values corresponding to different input variables;

generate different sets of sample bins corresponding to the different input variables, wherein the different sets of sample bins are generated according to a probability distribution of the different sets of values;

repeatedly process the different sets of values from the different sets of sample bins through the machine learning model to generate a set of sample predictions, wherein processing includes using a set of values from a set of sample bins corresponding to an individual input variable and original values corresponding to other input variables from the original dataset, as input to the machine learning model;

identify a set of influential input variables from the different input variables by comparing the set of sample predictions to an actual prediction, wherein the actual prediction is generated by processing the original dataset through the machine learning model;

receive a request to generate a prediction from an input record, wherein the input record includes the different input variables and different sets of actual values corresponding to the different input variables;

update the input record by modifying one or more actual values corresponding to the set of influential input variables, wherein the one or more actual values are modified by selecting a subset of sample values from a set of sample bins corresponding to the set of influential input variables; and process the updated input record through the machine learning model to generate the prediction.

9. The system of claim 8, wherein the instructions further cause the system to:
provide a justification for identification of the set of influential input variables, wherein the justification includes the set of sample predictions.

10. The system of claim 8, wherein the different sets of sample bins are further defined according to different bounds associated with the different sets of values from the original dataset.

11. The system of claim 8, wherein the different sets of values are associated with corresponding prior probabilities, and wherein a prior probability estimates a probability that a randomly selected input record contains a value from a set of values.

12. The system of claim 8, wherein the instructions further cause the system to:
map the set of influential input variables to a set of text descriptions; and
provide the set of text descriptions.

13. The system of claim 8, wherein the actual prediction indicates a likelihood that fraud is about to occur, and wherein the set of influential input variables is identified based on a reduction in a likelihood of the fraud occurring.

14. The system of claim 8, wherein the instructions further cause the system to:
generate a set of visualizations based on the set of sample predictions and the actual prediction, wherein the set of visualizations provides a justification for the set of influential input variables; and
provide the set of visualizations.

15. A non-transitory, computer-readable storage medium storing thereon executable instructions that, as a result of being executed by one or more processors of a computer system, cause the computer system to:

obtain an original dataset, wherein the original dataset is used to train a machine learning model prior to deployment of the machine learning model, and wherein the original dataset includes different sets of values corresponding to different input variables;

generate different sets of sample bins corresponding to the different input variables, wherein the different sets of sample bins are generated according to a probability distribution of the different sets of values;

repeatedly process the different sets of values from the different sets of sample bins through the machine learning model to generate a set of sample predictions, wherein processing includes using a set of values from a set of sample bins corresponding to an individual input variable and original values corresponding to other input variables from the original dataset, as input to the machine learning model;

identify a set of influential input variables from the different input variables by comparing the set of sample predictions to an actual prediction, wherein the actual prediction is generated by processing the original dataset through the machine learning model;

receive a request to generate a prediction from an input record, wherein the input record includes the different input variables and different sets of actual values corresponding to the different input variables;

update the input record by modifying one or more actual values corresponding to the set of influential input variables, wherein the one or more actual values are modified by selecting a subset of values from a set of sample bins corresponding to the set of influential input variables; and process the updated input record through the machine learning model to generate the prediction.

16. The non-transitory, computer-readable storage medium of claim 15, wherein the executable instructions further cause the computer system to:

provide a justification for identification of the set of influential input variables, wherein the justification includes the set of sample predictions.

17. The non-transitory, computer-readable storage medium of claim 15, wherein the different sets of sample bins are further defined according to different bounds associated with the different sets of values from the original dataset.

18. The non-transitory, computer-readable storage medium of claim 15, wherein the different sets of values are associated with corresponding prior probabilities, and wherein a prior probability estimates a probability that a randomly selected input record contains a value from a set of values.

19. The non-transitory, computer-readable storage medium of claim 15, wherein the executable instructions further cause the computer system to:

map the set of influential input variables to a set of text descriptions; and provide the set of text descriptions.

20. The non-transitory, computer-readable storage medium of claim 15, wherein the actual prediction indicates a likelihood that fraud is about to occur, and wherein the set of influential input variables is identified based on a reduction in a likelihood of the fraud occurring.

21. The non-transitory, computer-readable storage medium of claim 15, wherein the executable instructions further cause the computer system to:

generate a set of visualizations based on the set of sample predictions and the actual prediction, wherein the set of visualizations provides a justification for the set of influential input variables; and provide the set of visualizations.

* * * * *